Figure 1:
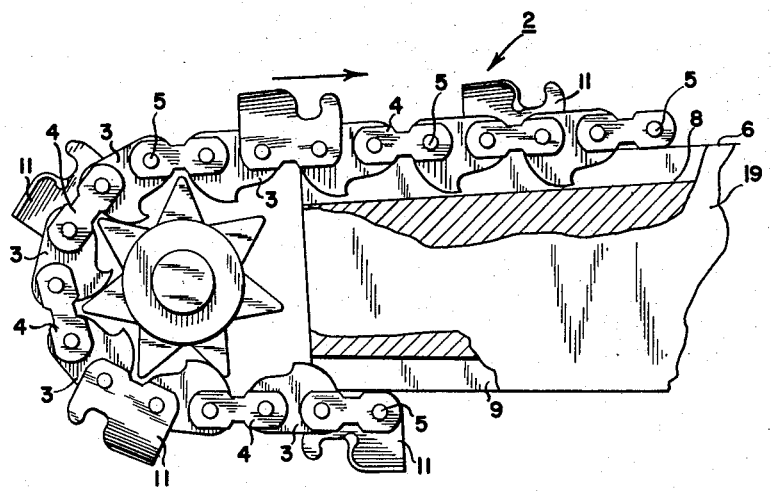

Jan. 28, 1964  A. V. BERNSTEIN ETAL  3,119,284
METHOD OF MAKING A SAW CHAIN
Filed July 27, 1960

INVENTORS
Axel Vilhelm Bernstein
Olof Andreas Backman 3,119,284
METHOD OF MAKING A SAW CHAIN
Axel Vilhelm Bernstein and Olof Andreas Backman, both of Sandviken, Sweden
Filed July 27, 1960, Ser. No. 45,763
Claims priority, application Sweden June 22, 1959
1 Claim. (Cl. 76—112)

This invention relates to saw chains of the type used on motor-driven chain saws, and more particularly to links for saw chains and to the manufacture thereof. This application is a continuation in part of my copending application Serial No. 37,888 filed June 22, 1960.

An object of this invention is to provide improved saw chains of the type used on portable motor driven chain saws. A further object is to provide improved cutter links for such saw chains. A still further object is to reduce the effects upon saw chains of normal and abnormal use and abuse. A further object is to overcome certain difficulties which have been encountered with chain saws and to reduce to a minimum the need for attention and service during use. These and other objects will be in part obvious, and in part pointed out below.

Figure 2:
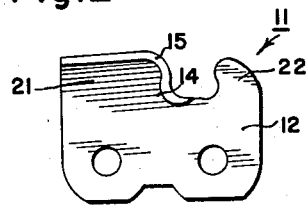

In the drawings:

FIGURE 1 is a fragmentary view of a portion of a chain saw with parts broken away; and, FIGURE 2 is a view of a cutter link of the saw chain of FIGURE 1.

Referring to FIGURE 1 of the drawing, the illustrative embodiment comprises a chain saw having a saw chain 2 which is driven along the peripheral guide edges of a guide bar or plate 19, for example, to cut through a log or tree. Saw chain 2 is formed by an assembly of: cutter links 11; drive and guide links 3; connecting links 4; and, rivets 5 which provide the interconnections between the links. The guide bar 19 has peripheral grooves 8 and 9 into which the guide portions of the drive and guide links 3 projects; and, the other links 11 and 4 rest upon guide surfaces 6 at the sides of the groove. Referring to FIGURE 2, each of the cutter links 11 is formed by a central plate portion 12, an integral depth gauge portion 22 and an integral cutting tooth 21. The cutting tooth portion 21 comprises a shank portion 14 projecting away from the central plane of the saw chain and a toe portion 15 which projects from the shank portion back to the central plane. The toe portion may be an acute angle or a right angle to the central plane. The saw chain includes cutter links of right and left configurations, and it also may include other types of cutting or slicing tooth links.

In the past, it has been standard practice to form the links of saw chains from carbon or low alloy steels. Saw chains formed of such steels have inherent disadvantages. For example, during use, the chain moves very rapidly along the guide bar, and the cutting links engage the wood so as to subject the links to substantial forces in the forms of steady pressures against the surfaces 6 and impact actions. This produces friction between the various portions of the chain links and the supporting and guiding surface. Chain saws are used under very severe and extreme weather conditions, and it is difficult to insure that the chains are properly serviced and lubricated. For example, during the winter months in northern climates when the ambient temperature is very low, a chain saw may be operated for long periods of time when the operator is unaware of the need for service and lubrication. During a period when a chain saw is not properly serviced or lubricated, the prior chains have been heated up by the high friction to temperatures which are above the transformation temperatures of the steels. Such actions have, in effect, heat-treated portions of the links so as to make them brittle and fragile, with the result that the chains failed. This action may be referred to as "friction hardening" of the links or link portions. It causes extreme hardness and brittleness, with the result that fissures appear at the edges of the links, and the links break.

In accordance with the present invention, saw chains or links, or parts or portions thereof, are formed of high chromium steel with characteristics rendering the chain relatively free from difficulties of the nature discussed above. The high chromium steel, of which these links are formed, is transformed to austenite at a relatively high temperature, and when it cools, it forms martensite, and it is then tempered. During the use of the saw chain, the high temperatures are produced for very short periods of time at any particular portion of a link, and it has been found that links formed of this steel will withstand such temperature conditions very well. That is, the steel is not hardened under the conditions of use which harden low-alloy steels.

In the illustrative embodiment, the saw chain links are formed of a martensitic high chromium steel containing the following: chromium—12% to 16%; carbon—.20% to .35%; silicon—preferably .10% to .35% and not more than .40%; nickel—not more than .30% and preferably not more than .20%; manganese—not more than 1%, and preferably not more than .5%; and, iron with normally appearing impurities. As a specific example, the cutter links 11 may be formed of steel containing: carbon—.25% to .30%, preferably .30%; silicon—.15% to .35%, preferably .30%; manganese—.15% to .35% and preferably .30%; phosphorus—not more than .030%; sulfur—not more than .030%; nickel—not more than .20%; chromium—13.5% to 14.5% and preferably 14%; and, iron with normally appearing impurities. In forming a cutter link 11 from this steel, the blank is stamped from cold rolled strip or sheet steel, and the cutting tooth portion 21 is then formed in dies to the desired shape. Illustratively, the links are then hardened from a temperature of 1050° C. and, after that, they are tempered at 200° C. The links are then sharpened to form the cutting edges; and, the chain is assembled utilizing the other links which have been similarly stamped from the same steel, and then hardened and tempered.

As another example, with a chromium content of the order of 16%, the steel may contain: .30% carbon; .35% silicon; 15% nickel. Generally the steel contains at least 12% chromium, but not more than 16% chromium. Generally the carbon content must be at least .20%, but not more than .35%. The manganese content of the steel does not appear to influence the qualities of the steel which are pertinent to the purposes of the present invention, except that the manganese content should not be more than 2%, and preferably not more than 1%. The steel for the cutter links should not contain excessive amounts of certain other elements, such as: titanium, niobium, tungsten and vanadium, because those elements tend to interfere with the ductility during forming of the cutter links. Illustratively, the steel may contain the following elements up to the percentages indicated, but with a total for all of them of not more than 2%: vanadium—.5%; molybdenum—1.0%; titanium—1.0%; boron—.1%; and aluminum—.1%. Also, the total quantity of titanium, niobium and tantalum should not exceed 1%, and the total of molybdenum and tungsten should not be more than 1%. Also, cobalt should not be more than .4%. While it has been indicated that the chromium content may be between 12% and 16%, it is commonly between 13.5% and 14.5%, and, illustratively, is 14%.

As indicated above, chain 2 is formed with at least links 11 made of the steel indicated above. The links 3, 4 and 5 may also be made of an identical steel. However, rivets 5 are of carbon or low alloy steel.

This invention contemplates that links 11 may have different portions formed of different steels, so as to give each portion the optimum characteristics. For example, cutter links 11 may have the cutting teeth, or merely the toe portions, formed of one specific steel, while the central plate portion 12 is formed of another steel. The steels from which the links are formed in accordance with the present invention have been referred to as martensitic high-chromium steel, which are steels having a chromium content of the order of 12% to 16%, and which have been heat treated and cooled to produce a martensitic structure in the steel which structure is very hard. This martensitic steel is then tempered to give it an improved ductility. While this class of steels has been referred to as high-chromium steel, it should be noted that these steels are also identified as "stainless steels." Hence, the links and the saw chains formed therefrom have the added advantage of being resistant to rust and corrosion.

The "friction hardening" effect referred to above is very serious with the side links 4 which move along the surface 6. Cutter links produced in accordance with the present invention have improved edge wear characteristics. That is, they remain sharp for a long period of time. Links produced in accordance with the present invention have considerably increased ductility or toughness, and resistance to shock. Impact tests have shown that links of this type are very resistant to the damage of impact. The fatigue strength is also improved.

The illustrative embodiments of the invention are found to be very satisfactory from a standpoint of forming the cutter links when the steel is in the annealed condition.

The method of forming the links may be outlined as follows:

(1) Anneal the bands, strips or sheets of cold rolled steel, or the stamped-out links, at a temperature between 750° and 850° C., preferably between 800° and 825° C. Cool very slowly from the hardening temperature down to at least 500° C. or 600° C. From 500° C. or 600° C., the cooling may be more rapid, for example, by exposure to air.

(2) Bend the cutting teeth in a die, or in another manner.

(3) Harden the links from a temperature between 950° C. and 1100° C., and preferably from 1050° C. By this hardening, the previous ferritic structure becomes martensitic.

(4) Temper at a temperature between 150° C. and 425° C., preferably between 180° C. and 300° C., and illustratively, 200° C. The tempered links should be as hard as possible without adversely affecting the ductility or toughness. Illustratively, the hardness should exceed $50H_{RC}$ (Rockwell C) and commonly may be as high as 52 to $54H_{RC}$ (Rockwell C).

(5) Sharpen the cutter teeth 11.

(6) Assemble the links and rivets into a saw chain.

As many possible embodiments of this invention may be made, all without departing from the scope of the invention, it is to be understood that all matter hereinabove set forth, or shown in the accompanying drawings, is to be interpreted as illustrative and not in a limiting sense.

What is claimed is:

The method of forming a saw chain of the type which includes links having integral cutting teeth, the steps of: stamping a link blank for a link which has an integral cutting tooth from a strip or sheet of cold rolled steel which is formed of iron and the normally appearing impurities and which contains, 12% to 16% chromium, .20% to .35% carbon, not more than .35% silicon, and not more than .35% nickel; forming the link from said link blank; hardening the link from a temperature between 950° C. and 1100° C. to form martensitic steel; tempering the link at a temperature between 150° C. and 425° C. to a hardness of at least 50 Rockwell C; sharpening the cutting tooth; and assembling the link thus formed with other links to produce a saw chain.

References Cited in the file of this patent

UNITED STATES PATENTS

| | | |
|---|---|---|
| 2,335,497 | Ehrsam | Nov. 30, 1943 |
| 2,508,784 | Cox | May 23, 1950 |
| 2,744,548 | Stephenson et al. | May 8, 1956 |
| 2,776,482 | Hafekost | Jan. 8, 1957 |
| 2,832,180 | Carlton | Apr. 29, 1958 |
| 2,854,866 | Mall et al. | Oct. 7, 1958 |

OTHER REFERENCES

"The A-B-C of . . . Steels," The Book of Stainless Steels, published by the American Society for Metals (Cleveland, Ohio), 1935, pages 228 and 229 relied upon.